United States Patent
Gudewer et al.

(10) Patent No.: US 9,653,977 B2
(45) Date of Patent: May 16, 2017

(54) SYNCHRONOUS GENERATOR OF A GEARLESS WIND ENERGY TURBINE

(71) Applicant: Wobben Properties GmbH, Aurich (DE)

(72) Inventors: Wilko Gudewer, Norden (DE); Wojciech Giengiel, Aurich (DE)

(73) Assignee: Wobben Properties GmbH, Aurich (DE)

( * ) Notice: Subject to any disclaimer, the term of this patent is extended or adjusted under 35 U.S.C. 154(b) by 75 days.

(21) Appl. No.: 14/402,564

(22) PCT Filed: Apr. 5, 2013

(86) PCT No.: PCT/EP2013/057253
§ 371 (c)(1),
(2) Date: Jan. 26, 2015

(87) PCT Pub. No.: WO2013/174566
PCT Pub. Date: Nov. 28, 2013

(65) Prior Publication Data
US 2015/0288267 A1    Oct. 8, 2015

(30) Foreign Application Priority Data

May 22, 2012    (DE) .......................... 10 2012 208 547

(51) Int. Cl.
*H02K 19/16* (2006.01)
*F03D 9/00* (2016.01)
(Continued)

(52) U.S. Cl.
CPC ............. *H02K 19/16* (2013.01); *F03D 9/002* (2013.01); *H02K 1/22* (2013.01); *H02K 7/1838* (2013.01); *H02K 15/00* (2013.01); *H02K 15/0006* (2013.01); *H02K 15/02* (2013.01); *H02K 2213/03* (2013.01); *H02K 2213/12* (2013.01); *Y02E 10/725* (2013.01); *Y10T 29/49012* (2015.01)

(58) Field of Classification Search
CPC ...... H02K 19/16; H02K 15/0006; H02K 1/22; H02K 7/1838; H02K 15/00; H02K 15/02; F03D 9/002
USPC .................................... 290/44, 55
See application file for complete search history.

(56) References Cited

U.S. PATENT DOCUMENTS

| | | |
|---|---|---|
| 6,864,611 B1 | 3/2005 | Wobben |
| 7,321,176 B2 | 1/2008 | Strothmann |

(Continued)

FOREIGN PATENT DOCUMENTS

| | | |
|---|---|---|
| CL | 7732011 A1 | 10/2011 |
| CL | 31392014 A1 | 2/2015 |

(Continued)

*Primary Examiner* — Viet Nguyen
(74) *Attorney, Agent, or Firm* — Seed Intellectual Property Law Group LLP (57) ABSTRACT

The present invention concerns a synchronous generator of a gearless wind power installation, comprising a stator and a multi-part external rotor. The invention also concerns a wind power installation having such a generator. Furthermore the present invention concerns a transport arrangement for transporting a synchronous generator of a gearless wind power installation.

16 Claims, 5 Drawing Sheets

(51) Int. Cl.
*H02K 15/00* (2006.01)
*H02K 15/02* (2006.01)
*H02K 1/22* (2006.01)
*H02K 7/18* (2006.01)

(56) References Cited

U.S. PATENT DOCUMENTS

| | | | |
|---|---|---|---|
| 7,432,610 B2 | 10/2008 | Wobben | |
| 8,072,114 B2 | 12/2011 | Ciampolini et al. | |
| 2004/0108733 A1* | 6/2004 | Wobben | F03D 1/065 290/55 |
| 2008/0211326 A1* | 9/2008 | Kang | H02K 21/145 310/44 |
| 2008/0309189 A1* | 12/2008 | Pabst | H02K 1/148 310/216.008 |
| 2008/0315707 A1* | 12/2008 | Wobben | F03D 9/002 310/203 |
| 2009/0134629 A1* | 5/2009 | Stiesdal | F03D 9/002 290/55 |
| 2009/0212568 A1 | 8/2009 | Maibach et al. | |
| 2009/0218900 A1* | 9/2009 | Dickes | H02K 1/148 310/156.12 |
| 2009/0236857 A1* | 9/2009 | Stommel | F03D 1/0675 290/55 |
| 2009/0295168 A1* | 12/2009 | Meinke | F03D 9/002 290/55 |
| 2009/0322165 A1* | 12/2009 | Rittenhouse | H02K 1/2786 310/43 |
| 2010/0013346 A1* | 1/2010 | Peek | H02K 16/04 310/216.007 |
| 2010/0024311 A1* | 2/2010 | Wambeke | E04H 12/085 52/40 |
| 2010/0207474 A1* | 8/2010 | Osada | H02K 16/02 310/114 |
| 2011/0042957 A1* | 2/2011 | Drews | F03B 7/003 290/54 |
| 2011/0260467 A1 | 10/2011 | Gudewer | |
| 2011/0298330 A1* | 12/2011 | Joeckel | F03D 9/002 310/216.008 |
| 2011/0316366 A1* | 12/2011 | Abbasian | H02K 16/04 310/46 |
| 2012/0098268 A1* | 4/2012 | Gelmini | F03D 9/002 290/55 |
| 2012/0112466 A1* | 5/2012 | Junge | H02K 1/276 290/55 |
| 2012/0169054 A1* | 7/2012 | Roos | F03B 3/04 290/52 |
| 2012/0181792 A1* | 7/2012 | Pettersen | F03D 9/002 290/55 |
| 2012/0261920 A1* | 10/2012 | Aso | F03D 7/0204 290/44 |
| 2012/0299430 A1* | 11/2012 | Pennander | H02K 1/2773 310/156.15 |
| 2013/0088103 A1 | 4/2013 | Pescarmona | |
| 2014/0028138 A1* | 1/2014 | Feher | F03D 1/001 310/156.08 |
| 2014/0062231 A1* | 3/2014 | Casazza | F03D 9/002 310/59 |
| 2014/0091673 A1* | 4/2014 | Anbarasu | H02K 3/28 310/216.109 |
| 2015/0180288 A1 | 6/2015 | Röer et al. | |
| 2015/0256050 A1* | 9/2015 | Muniz Casais | H02K 1/185 310/156.12 |

FOREIGN PATENT DOCUMENTS

| | | |
|---|---|---|
| CN | 2821195 Y | 9/2006 |
| DE | 19636591 A1 | 3/1998 |
| DE | 199 23 925 A1 | 12/2000 |
| DE | 10 2009 032 885 A1 | 2/2011 |
| DE | 10 2010 039 590 A1 | 2/2012 |
| EP | 1 419 315 B1 | 9/2005 |
| EP | 2112748 A1 | 10/2009 |
| EP | 2 149 703 A2 | 2/2010 |
| JP | 2004537247 A | 12/2004 |
| JP | 2011172369 A | 9/2011 |
| NZ | 589730 A | 9/2011 |
| RU | 2115020 C1 | 7/1998 |
| RU | 2208700 C1 | 7/2003 |
| RU | 2379814 C1 | 1/2010 |
| WO | 2011/006810 A2 | 1/2011 |
| WO | 2011051555 A2 | 5/2011 |

\* cited by examiner

SYNCHRONOUS GENERATOR OF A GEARLESS WIND ENERGY TURBINE

BACKGROUND

Technical Field

The present invention concerns a synchronous generator of a gearless wind power installation. The application also concerns a wind power installation having such a generator. Furthermore the present application concerns a transport arrangement for transporting a synchronous generator of a gearless wind power installation.

Description of the Related Art

Figure 1:
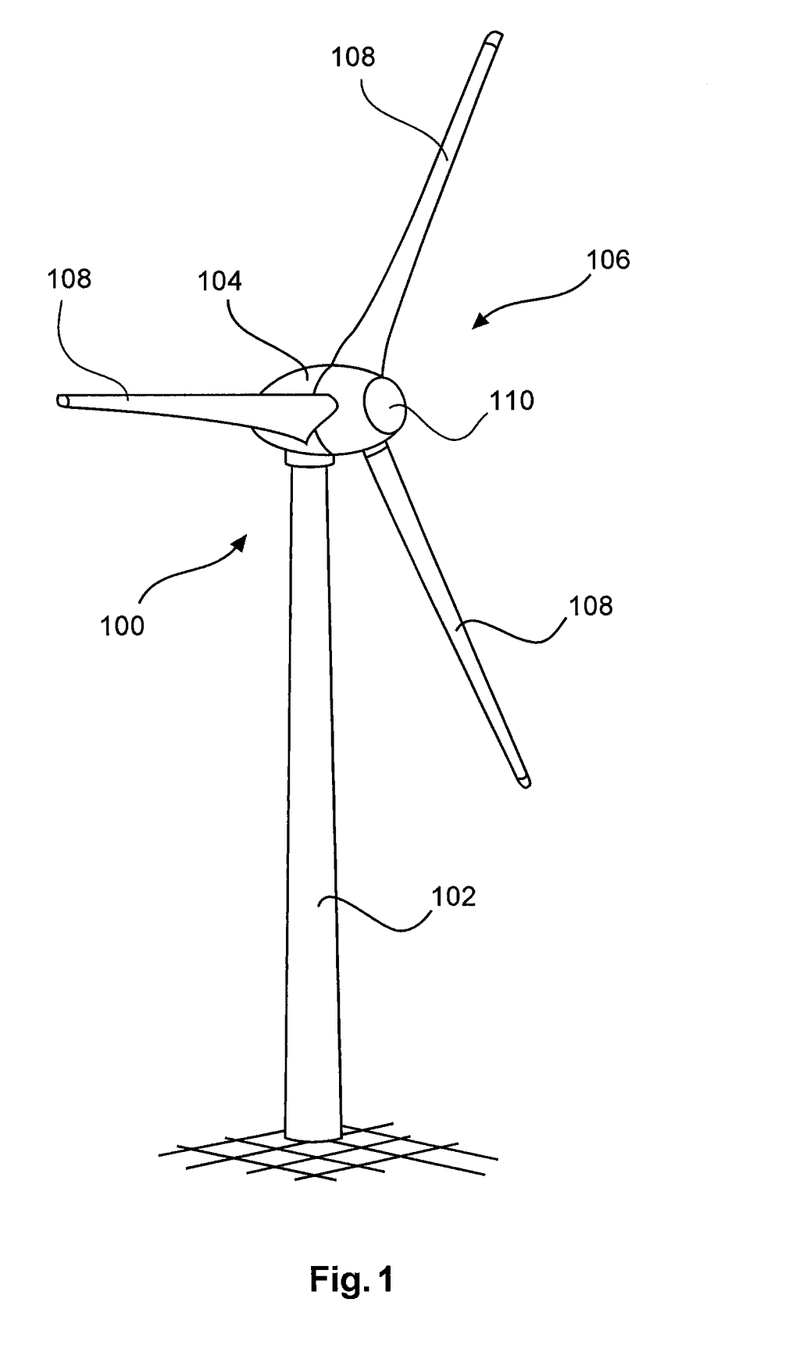
FIG. 1 shows a perspective view of a wind power installation.

Wind power installations, in particular horizontal-axis wind power installations, of which one is shown in FIG. 1, are generally known. In the case of a gearless wind power installation as shown in FIG. 1 an aerodynamic rotor directly drives the rotor of a generator so that the generator converts the kinetic energy obtained from the wind into electric energy. Therefore the rotor of the generator rotates as slowly as the aerodynamic rotor. To take account of such a slow speed of rotation the generator is of a generator diameter which is comparatively large in relation to the nominal power, in particular being of a large air gap diameter. In that way, in spite of the slow speed of rotation, it is possible to achieve a comparatively high differential speed between generator rotor and stator in the region of the air gap. Modern wind power installations such as for example an E126 from ENERCON GmbH has a nominal power of 7.5 MW. The E126 is also a gearless wind power installation and requires a generator which is also correspondingly large from the point of view of structural size.

A problem in that respect is in particular that of transporting such a generator to an erection location for the wind power installation. In many countries the maximum width which can be transported on the road is about 5 m. That means that the maximum diameter of the generator may be 5 m in transport when the generator is transported in a lying position, that is to say with an axis of rotation perpendicular to the road. The diameter of a generator is thereby de facto limited. Even if such a transport problem could be resolved for many erection locations, in particular those in the proximity of a generator manufacturer or in the proximity of a port, nonetheless a standard generator which is the aim to achieve and which is frequently to be used is limited by that transportation dimension.

The specified wind power installation of type E126 has a generator with an air gap diameter of about 10 m. With that generator the transport problem is resolved by the generator being transported in several parts, more specifically by the generator rotor and stator each being subdivided into four parts. The rotor and stator are thus delivered in individual parts and assembled on the building site or in the proximity thereof.

A problem in that respect is that such separated parts have to be re-assembled on site and thus outside of the generator manufacturing facilities. It is complicated and expensive and susceptible to defects. Checking of the assembly or checking of the finished generator is also more difficult on site and thus more complicated and expensive and also more susceptible to defect, than at the location where the generator is manufactured.

Thus it is known for example from other wind power installations from ENERCON GmbH that a continuous winding for the stator can be advantageous. That is described for example in European patent EP 1 419 315 B1. The winding described therein of the stator is very complicated and expensive and basically can only be reliably implemented in the factory premises. It will be noted however that the result is a generator which is highly reliable in operation. A continuous winding which is implemented in the factory premises in that respect excludes separation into a plurality of parts for transport purposes.

The German Patent and Trade Mark Office searched the following state of the art in the priority application: DE 199 23 925 A1, US 2010/0024311 A1, DE 10 2009 032 885 A1, and DE 10 2010 039 590 A1.

BRIEF SUMMARY

One or more embodiments of the invention are directed to a generator that is as large as possible of a wind power installation, but also takes into account the above stated transport problems and which at the same time enjoys a high level of reliability. At least the invention seeks to propose an alternative solution.

According to one embodiment of the invention there is proposed a synchronous generator of a gearless wind power installation includes a stator and a rotor. To provide a distinction in terms of language from the aerodynamic rotor which substantially comprises a hub and one or more and in particular three rotor blades, the term rotor is used hereinafter for the rotating part of the generator, as opposed to the term aerodynamic rotor. According to one embodiment, a multi-part external rotor is used. The generator is thus an external rotor generator with an inwardly disposed stator and an outwardly disposed rotor. In addition the rotor is divided, more specifically at least into two parts. The stator is in particular not divided.

It was thus realized that an increase in the diameter of the generator is possible, without dividing the stator. An inwardly disposed stator can thus be in one piece and can be of a size up to the maximum transport width. In that case the outside diameter of the stator approximately corresponds to the mean diameter of the air gap or, stated in precise terms, the inside diameter of the air gap.

The external rotor however is of a larger outside diameter, namely larger than the air gap diameter, and can thus also be larger than the maximum transport width. Accordingly it is proposed that the external rotor is divided. In that respect the underlying realization is that division of the rotor, particularly if it is an external rotor, is linked to few problems. Even if the generator is a separately excited synchronous generator and thus the rotor has to be electrically supplied with an excitation current, separation of such a rotor gives rise to few problems. More specifically, for separate excitation, it is only necessary to provide a direct current so that, when the rotor is separated and accordingly when the rotor is assembled again, it would only be necessary to re-connect suitable direct-current lines, in the simplest case two direct-current lines. In that case the susceptibility to defects is slight, in particular in comparison with a level of complication and expenditure that would be necessary for a 3-phase or even 6-phase stator.

Due to the system involved, a separately excited rotor, at any event in usual gearless wind power installations, includes many individual rotor poles, namely cores with corresponding coils. As each rotor pole carries a direct-current winding, a continuous winding as is known for example for the stator is not a viable proposition for the rotor. That facilitates divisibility.

According to an embodiment it is proposed that the synchronous generator is in the form of a ring generator. A ring generator describes a structural form of a generator in which the magnetically operative region is arranged substantially on a ring shaped region concentrically around the axis of rotation of the generator. In particular the magnetically operative region, namely of the rotor and the stator, is only arranged in the radially outer quarter of the generator. Nonetheless a support structure for the stator can be provided in the center of the generator.

Preferably there are at least 48, further preferably at least 72 and in particular at least 192 stator poles. A multi-pole generator is thus proposed. That is suitable as a slowly running generator and is thus excellently well adapted to use in the gearless wind power installation.

In addition it is advantageously proposed that the generator is in the form of a 6-phase generator, namely a generator which has two 3-phase systems which are displaced relative to each other in particular through about 30°. That gives a very uniformly generated, namely substantially 6-phase current which is advantageous in terms of further processing. In particular such a 6-phase current is well suited to subsequent rectification and then further processing with a frequency converter. In particular it is advantageous for a so-called full-conversion concept in which the generated current is completely rectified—disregarding any losses—and prepared by the converter for feed into a power network.

An advantageous embodiment which is also proposed is one in which the stator of the synchronous generator has a continuous winding. In that way the stator can be produced in a highly reliable fashion, in particular without unnecessary electric connection points, thereby achieving in that respect a minimization in the susceptibility to faults. In particular in that case it is not possible for electric contacts to come loose, insofar as there are no electric contacts.

In particular the stator is undivided in such a way that there is an undivided stator iron core which in operation carries the magnetic field and accommodates the winding or windings. That does not exclude dismantleability of individual elements such as for example fixing elements, cooling elements, cover elements or the like.

In an embodiment it is proposed that the stator is of an outside diameter of more than 4.3 m. That permits a comparatively large air gap diameter with an undivided stator which in that respect takes account of maximum transport dimensions. Preferably there is provided a stator of an outside diameter of more than 4.7 m. In particular it is proposed that the outside diameter of the stator is about 5 m. In that way it is possible to make use of the maximum transport width and in that respect the synchronous generator can be optimized or maximized without problematical division of the stator being required. Therefore the use of a stator of an outside diameter of 5 m, for an undivided stator, achieves the maximum structural size—in respect of diameter—if that 5 m is viewed as the upper transport size limit.

In an embodiment it is proposed that the rotor is composed in the peripheral direction of a plurality of rotor segments, in particular two or four rotor segments. Preferably in that respect a symmetrical division is proposed, wherein all and/or each two rotor segments are of the same size and in particular constitute a segment of a circle of the same size. In that way assembleability and/or transport can be simplified and facilitated and frequently also standardized.

Preferably there are provided rotor segments with differing numbers of rotor poles. This configuration also permits symmetrical division of the rotor if for example there are two small and two large segments which are each of the same size and which in particular each have the same number of rotor poles. For example a rotor with 48 poles can be subdivided into four segments, of which two each have 8 poles and the other two each have 16 poles. In that way it is possible for example to provide that there are two large segments which impart basic stability to the rotor, wherein the two smaller segments, upon being assembled, basically join the two large segments together.

In an advantageous embodiment there is proposed a synchronous generator with an axis of rotation, in which at least two rotor segments can be removed for transport purposes. In that respect the synchronous generator is so designed that, when the two rotor segments are removed, the greatest extent of the synchronous generator in one direction is determined by the stator and in another direction by the rotor. More specifically it is proposed in particular that the stator in a first transverse direction relative to the axis of rotation of the stator forms the greatest extent of the synchronous generator and that in a longitudinal direction transversely relative to the axis of rotation and transversely relative to the transverse direction the rotor forms the greatest extent of the synchronous generator. Accordingly the synchronous generator is of such a design configuration that two, in particular mutually opposite rotor segments are removed and thereby the dimension of the generator is reduced precisely at that location, more specifically to the diameter of the stator. Those removable and accordingly then removed rotor segments only need to be so large that removal thereof has precisely the result that the stator then forms the largest dimension there. A further reduction in the dimension of the generator in that direction is then no longer possible because the stator cannot be dismantled, at any event not substantially.

Upon transport the transverse direction is then preferably to be oriented transversely relative to the direction of travel of the transport vehicle, with the result that the transport width of the loaded vehicle was reduced to the outside diameter of the stator. The dimensions of the generator do not need to be reduced in the longitudinal direction, more specifically therefore also in the direction of travel of the transport vehicle. The rotor or rotor segments can remain here and the generator thus has the outside diameter of the rotor as the outside dimension in that direction.

Preferably a synchronous generator is used, which has a nominal power of at least 500 kW, at least one MW and in particular at least two MW. Thus there is proposed a synchronous generator for a wind power installation with a high nominal power. That can advantageously be implemented by an undivided stator and a divided rotor.

There is also proposed a wind power installation having a synchronous generator according to at least one of the above-mentioned embodiments. Accordingly it is possible to achieve a wind power installation with a maximized generator, with at the same time a high level of reliability, which in addition does not generate any unnecessary transport problems.

In addition there is proposed a transport arrangement for transporting a partly dismantled synchronous generator, in particular for transporting a synchronous generator according to one of the above-described embodiments. That synchronous generator has a stator and an external rotor. The transport arrangement includes a main transport portion which can also be referred to as the main transport part and that main transport portion includes the stator of the synchronous generator. The transport arrangement further includes at least two rotor segments removed from the synchronous generator. Accordingly it is proposed that the synchronous generator is partly dismantled for transport purposes, with the stator being transported in one piece.

Preferably the at least two removed rotor segments are in the form of two rotor halves and are fitted together in mutually displaced relationship into a transport position in such a way that they together in one direction are of a dimension which does not exceed an outside diameter of the stator. In that respect it is assumed in particular that the two rotor halves are in the form of ring segments and a limb of each of the two ring segments is partially arranged between two limbs of the respective other ring segment. In order to achieve a dimension which does not exceed the diameter of the stator in at least one direction with that arrangement, the ring segments and thus the ring of the assembled rotor must be correspondingly slender.

In a further embodiment it is proposed that the main transport portion includes at least one rotor segment, in particular two rotor segments, which are mounted to the synchronous generator. In that case the main transport portion is of such a configuration and the rotor segments which remain mounted to the stator are correspondingly selected such that the main transport portion in a first direction is of a width corresponding to the outside diameter of the stator and in a second direction of a length corresponding to the outside diameter of the rotor. In that respect in particular the first direction is oriented transversely relative to a direction of travel in the transport situation and the width is then in particular the actual width of a transport vehicle which is loaded in that way. In that respect the second direction is in particular in the direction of travel. The first and second directions are preferably approximately in one plane and approximately at a right angle to each other.

Preferably the transport arrangement includes a partly dismantled synchronous generator, as was described hereinbefore in at least one embodiment. It is also advantageous if the main portion of the transport arrangement includes a partial synchronous generator according to one of the above-described embodiments, but without the rotor segments which were removed from the synchronous generator. In other words, the main portion of the transport arrangement substantially corresponds to the synchronous generator as a whole, from which however rotor segments were removed at least to such an extent that at any event in one direction the width of the synchronous generator could be reduced to the size, namely the diameter, of the stator. Thus there is proposed transportation of a synchronous generator, in respect of which the proposal is for dismantling of rotor segments to be reduced to a minimum.

In addition there is proposed a method of transporting a synchronous generator of a gearless wind power installation to the wind power installation erection location. In that case the synchronous generator is partly dismantled, by at least two rotor segments being removed. In that case transport to the erection location of a wind power installation also includes transport to a temporary production site in the proximity of the erection location of the wind power installation, namely in particular a production site at which for example the synchronous generator can be assembled and transport from there to the erection location which is in the immediate proximity is basically not subjected to any transport restrictions, in particular in regard to transport width. In other words, transport on public roads is already brought to a close, when such temporary production locations are reached.

BRIEF DESCRIPTION OF THE SEVERAL VIEWS OF THE DRAWINGS

The invention is described by way of example hereinafter by means of embodiments with reference to the accompanying Figures.

DETAILED DESCRIPTION

Hereinafter the same or similar elements of the same or similar embodiments can be shown on different scales.

FIG. 1 shows a wind power installation 100 comprising a pylon 102 and a pod 104. Arranged on the pod 104 is a rotor 106 having three rotor blades 108 and a spinner 110. In operation the rotor 106 is caused to rotate by the wind and thereby drives a generator in the pod 104.

Figures 2, 3:
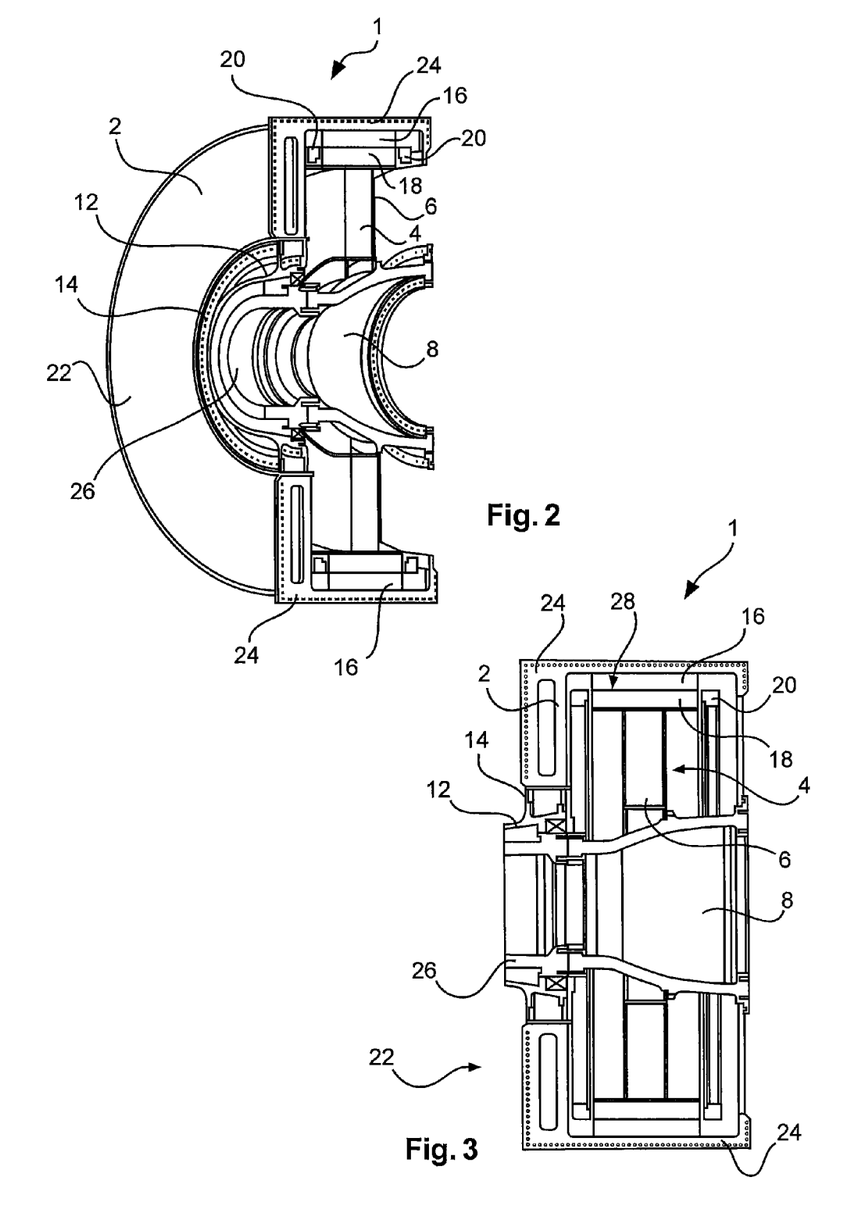
FIG. 2 shows a diagrammatic perspective sectional view of a synchronous generator.
FIG. 3 shows a diagrammatic sectional side view of the synchronous generator of FIG. 2.

The synchronous generator 1 in FIG. 2 has a divided external rotor 2 and a one-piece stator 4. The stator 4 is carried by means of radial support plates 6 on a mounting journal 8 which can also be referred to as an axle mounting journal.

A rotor hub 12 is shown for use of the synchronous generator 1 in a wind power installation, the rotor hub 12 carrying rotor blades not shown in FIG. 2 and being fixed by way of a hub flange 14 to the external rotor 2 in order thereby to rotate the external rotor 2 relative to the stator 4.

For that purpose the external rotor 2 has pole assemblies 16 which rotate relative to a stator assembly 18. That rotation causes generation of a current which is generated in windings or which is passed on, in relation to which FIG. 2 only indicates winding heads 20. FIG. 2 is a perspective sectional view, wherein some section surfaces, namely in particular that of the stator assembly 18 and also of the mounting journal 8 are not shown in hatched form. The illustrated pole assemblies 16 however are shown by a side view which is afforded by an actual division of the external rotor 2.

Of the external rotor 2 FIG. 2 shows only one external rotor half 22. The external rotor half 22 has a connecting flange 24 for connection to a further external rotor half 22. That connecting flange projects in the example shown in FIG. 2 beyond the basically ring shape and the dimension of such a ring of the external rotor 2. It is to be noted in that respect that the synchronous generator 1 is intended for a gearless wind power installation and is thus a slow-speed rotor. Any wind resistance due to that projecting connecting flange 24 therefore does not cause any problems in terms of operation of the synchronous generator 1. In addition the external rotor 2 and therewith also the connecting flange 24 are provided in a hub cover arrangement or in a spinner casing, together with which it rotates.

FIG. 2 also shows an axle journal 26 in the arrangement, that is fixedly connected to the mounting journal 8 or the axle mounting journal 8 and which can rotatably carry the rotor hub 12 in a region outside the view in FIG. 2, by way of a suitable rotary bearing. Because the rotor hub 12 in the assembled condition is fixedly connected to the external rotor 2 by way of the hub flange 14 the external rotor 2 is also carried by way thereof.

FIG. 3 shows a sectional side view of the synchronous generator of FIG. 2, insofar as at any event the stator 4 and other stationary parts, namely the mounting journal 8 and the axle journal 26 are shown in section. Formed between the rotor pole assemblies 16 and the stator assembly 18 is an air gap 28 which determines the transport dimension of the synchronous generator 1. In the illustrated example the air gap diameter is 5 m. In this respect for the sake of simplification the fact that the air gap as such is itself a few millimeters thick is disregarded. In that respect the outside diameter of the stator 4 which when the air gap thickness is disregarded corresponds to the air gap diameter determines the transport width. For transport purposes therefore the two external rotor halves 22 of which a respective one is shown in FIGS. 2 and 3 can be removed from the synchronous generator 1 and the outside diameter of the stator 4, namely the outside diameter in the region of the stator assembly 18, remains as the maximum dimension.

When the synchronous generator 1 is assembled after transport the two external rotor halves 22 can be connected together by way of the connecting flange 24. The rotor hub 12 can then be fixedly secured at the hub flange 14 to the external rotor 2 which is now assembled from the two external rotor halves 22. In that case it is possible to provide a bearing arrangement for the rotor hub 12 on the axle journal 26, by which at the same time the external rotor 2 is also at least partially supported.

Figure 4:
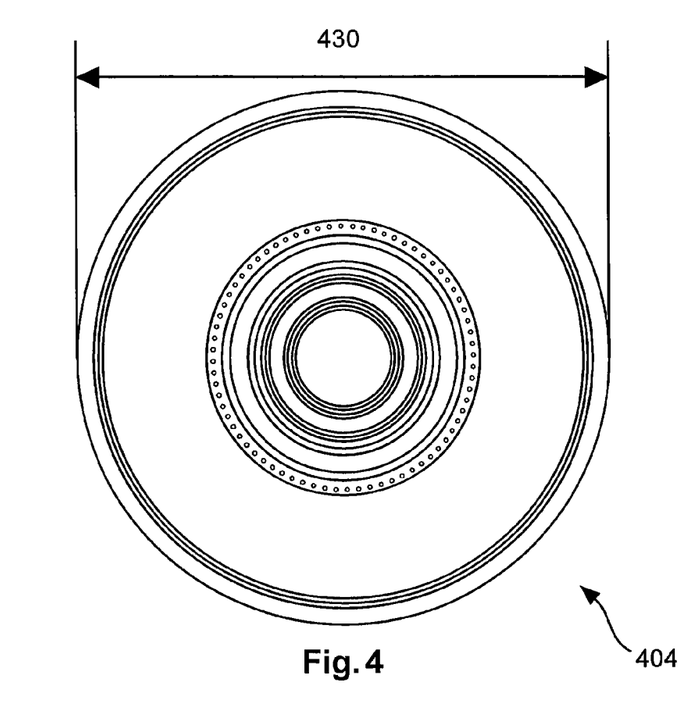
FIG. 4 shows an axial plan view of a stator.

FIG. 4 shows a diagrammatic axial view of a stator 404, the stator 404 being very similar to the stator 4 in FIGS. 2 and 3. Only the stator 404 is shown in FIG. 4 and its outside diameter 430 therefore determines the maximum dimension and thus the necessary width for transport on a vehicle.

Figure 5:
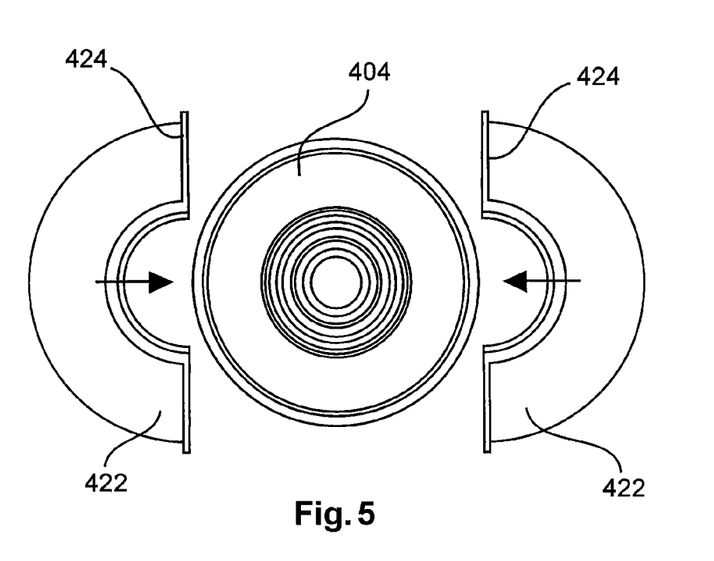
FIG. 5 shows an axial plan view of a partly dismantled synchronous generator.

Adjacent to the one-piece stator 404 FIG. 5 shows an axial side view of a divided external rotor with a respective external rotor half 422. In this case FIG. 5 shows the assembly of the two external rotor halves 222 which are moved towards each other as shown by the indicated arrows, and in so doing receive the stator 404 in them. For fixing purposes the connecting flanges 424 of the two external rotor halves 422 are moved towards each other and then screwed together. It can already be seen from FIG. 5 that the space required for transportation of the stator 404 is reduced by this simple measure, namely breaking the external rotor down into two removable segments. In this case the two external rotor halves 422 can be well transported in the illustrated dismantled condition.

Figure 6:
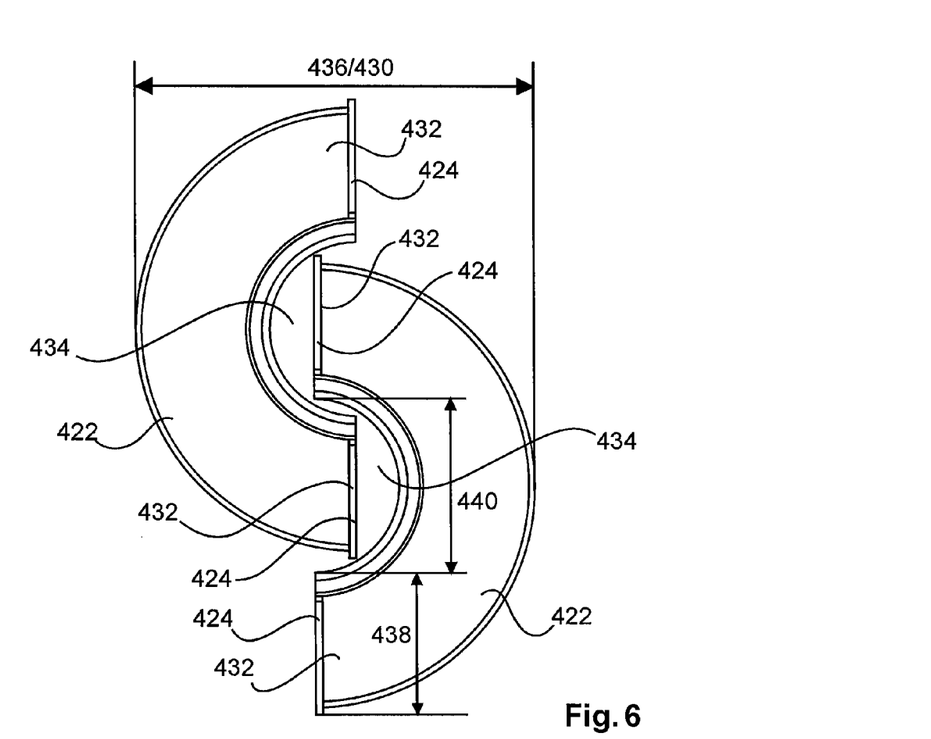
FIG. 6 shows a plan view of two rotor segments which are fitted together in space-saving relationship for transport purposes.

FIG. 6 shows a possible way of placing the two external rotor halves 422 one within the other to save as much space as possible. In this case the two external rotor halves 422 are respectively placed with a limb 432 in a semi-enclosed inner region 434 of the respective external rotor half 422. In that case a limb 432 is in particular a portion of the external rotor half 422, that ends at a connecting flange 424.

Such an arrangement can provide a transport width 436 which corresponds to or at least does not exceed the size of the outside diameter 430 of the stator 404.

To be able to achieve such interfitting relationship as shown in FIG. 6 the rotor halves 422 are each in the form of ring segments with a maximum radial thickness 438 which in the illustrated example is determined ultimately by the dimension of the connecting flange 424. That radial thickness 438 must be less than an inside free diameter 440 of the external rotor 402.

Figure 7:
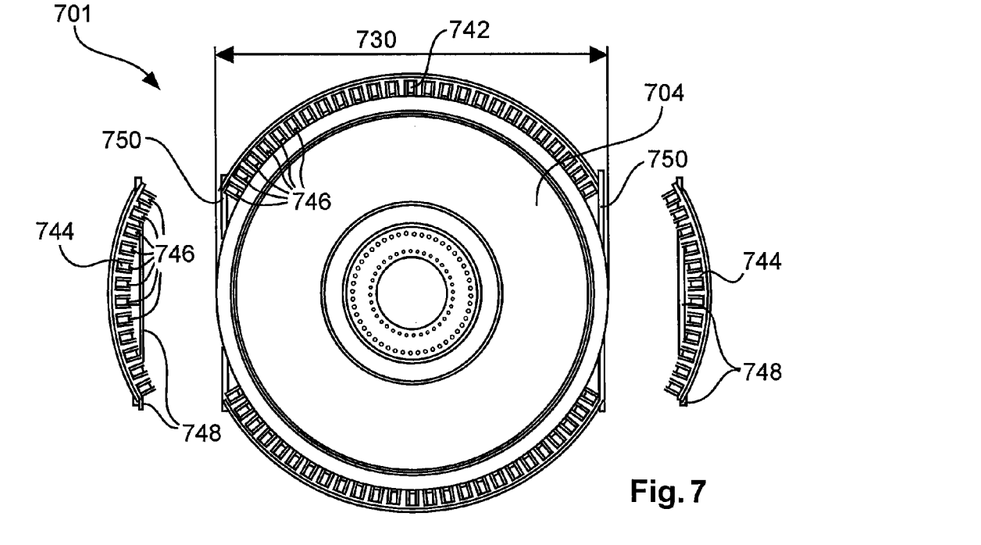
FIG. 7 shows a diagrammatic axial view of a partly dismantled synchronous generator according to a further embodiment.

FIG. 7 shows a diagrammatic axial view of a further embodiment of a synchronous generator 701. That synchronous generator 701 has a stator 704 and a divided external rotor. The divided external rotor has a large rotor segment 742 and two small external rotor segments 744. For transport purposes the small external rotor segments 744 are removed and are correspondingly shown separately in FIG. 7. Removal of those two small external rotor segments 744 means that the diameter or width of the synchronous generator 701 is limited in a region to the outside diameter 730 of the stator 704. Such a limitation or reduction in the width of the synchronous generator 701 to the value of the diameter 730 of the stator 704 can thus be attained without the external rotor having to be completely dismantled. The removal of two small external rotor segments can be sufficient. The stator 704, together with the two large external rotor segments 742, forms substantially a main transport portion. In the illustrated example the external rotor 702 has rotor poles 746, wherein the two small external rotor segments 744 each have 12 poles and the two large external rotor segments 742 each have 24 poles.

For fixing purposes the two smaller external rotor segments 744 each have a respective secant flange 748. A respective counterpart flange 750 is correspondingly provided on the rest of the synchronous generator 701. In that way the synchronous generator 701 can already enjoy comparatively high stability even when the small external rotor segments 744 are removed because the counterpart flanges 750 and further elements can connect the two large external rotor segments 742 remaining on the synchronous generator 701, even without fixing to the respective small external rotor segments 744. The secant flanges 748 and the corresponding counterpart flanges 750 can in this case be in the form of flat level connecting flanges and thereby provide a comparatively simple possible way of fixing the small external rotor segments 744 to the remaining synchronous generator 701. At the same time this gives a stable connection which can also be comparatively easily checked, namely in particular by simply viewing it.

Figure 8:
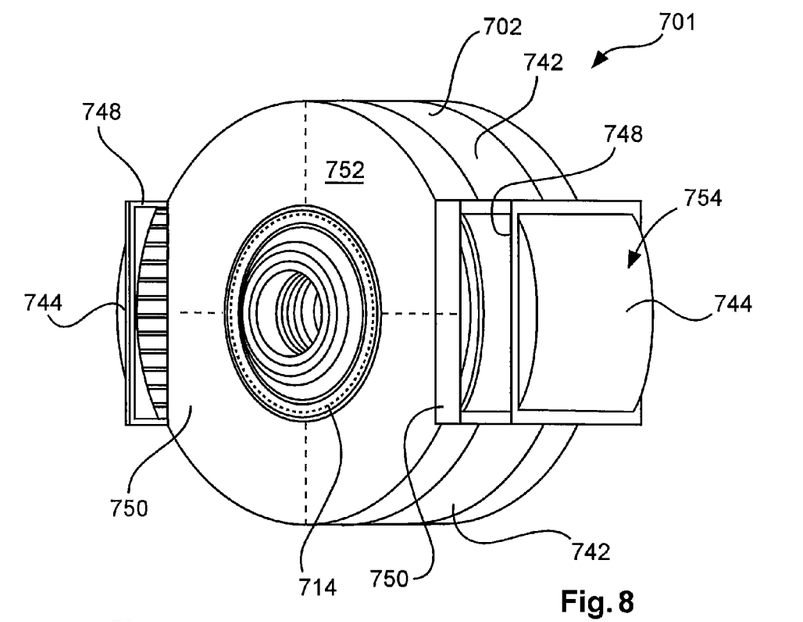
FIG. 8 shows a perspective view of a partly dismantled synchronous generator of FIG. 7.

The perspective view in FIG. 8 of the synchronous generator 701 also clearly illustrates a basically preferred encapsulated configuration of the external rotor 702. An encapsulated configuration therefore represents a preferred design not only in the illustrated variant but generally. The two small external rotor segments 744 form only a very small part of the entire external rotor 702. It can be seen that removal of the two small external rotor segments 744 scarcely influences the stability of the construction of the external rotor 702, at any event for transport of the synchronous generator 701. A high degree of stability is already afforded by an overall rigid external casing 752 on the external rotor 702.

The two counterpart flanges 750 are provided in that rigid casing 752 and are adapted for connection to the secant flanges 748. It can also be seen from FIG. 8 that the secant flanges 748 enjoy good accessibility for assembly and dismantling. The two small external rotor segments 744 are also enhanced in their stability by a casing portion 754.

Provided for mounting the synchronous generator 701 in a wind power installation is a hub flange 714 to which the aerodynamic rotor can be fixed in simple fashion.

Figure 9:
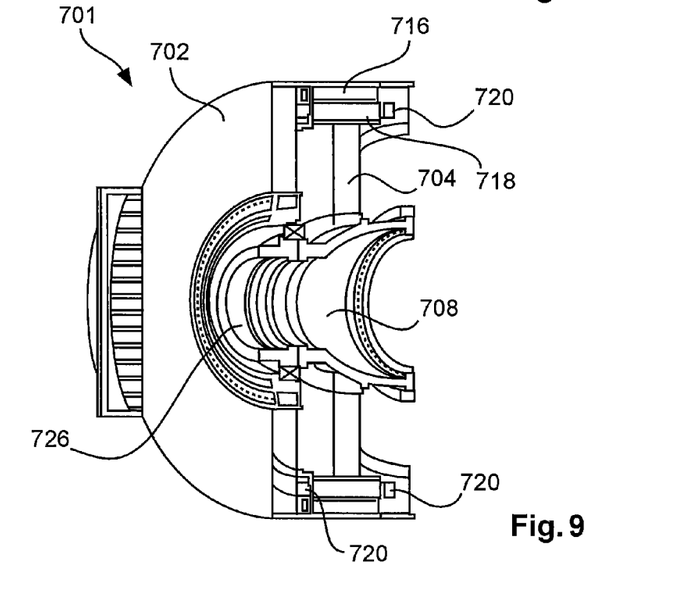
FIG. 9 shows a diagrammatic perspective sectional view of a partially dismantled synchronous generator as shown in FIGS. 7 and 8.

FIG. 9 in its diagrammatic sectional view of the synchronous generator 701 shows that the structure thereof is quite similar to that shown in FIGS. 2 and 3. Here too there is provided a stator 704 having a stator assembly 718 and winding heads 720. As shown in FIG. 9 the external rotor 702 also has pole assemblies 716 which rotate relative to the stator assembly 718. A mounting journal 708 and an axle journal 726 fixed thereto are also provided for mounting purposes. The embodiment of FIGS. 7 to 9 differs from that of FIGS. 2 and 3 essentially by the nature of the division of the external rotor 2 and 702 respectively. In the embodiment of FIGS. 2 and 3 this proposes subdivision into two substantially identical external rotor halves 22 whereas the embodiments in FIGS. 7 to 9 only propose the dismantling of two small external rotor segments 744.

Thus there is proposed a synchronous generator with the largest possible air gap diameter while complying with a predetermined maximum transport width, in particular while complying with a transport width of 5 m. In that respect the complication and expenditure in terms of separation of the generator components is kept low. In addition this proposes division of the generator components, in a manner that is optimized for transport.

A high degree of connection and winding complication and expenditure at a stator separation location at which in particular a three-phase current system or even two three-phase current systems must be divided and then re-assembled at the erection location of the wind power installation is eliminated. Accordingly it is possible to reduce the connection and winding complication and expenditure at one or more corresponding separation locations. In addition the number of any separation locations is also reduced.

The stator can in this case be of an implementation without separation. The rotor, namely the electromagnetic rotor member of the synchronous generator, is divided at least into two elements, preferably into a plurality of elements. Basically the proposal is for a rotor and a series connection of the poles or pole shoes when it is separately excited. In that respect the separation complication and expenditure is reduced in regard to the separation of such a rotor, at any event in comparison with separating a multi-phase ac voltage system on a stator. As a result inter alia transport-optimized division is proposed. In particular in the embodiments shown in FIGS. 7 to 9, joint transport of stator and a part of the rotor is proposed, in respect of which only two side portions of the rotor have to be transported by an extra transport system.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A synchronous generator of a gearless wind power installation, wherein the synchronous generator has an axis of rotation, the synchronous generator comprising:
 a stator including a unitary stator core, and
 a rotor located outwardly of the stator, the rotor including at least two separable rotor segments, wherein the at least two rotor segments are configured to be separable from each other during transport of the synchronous generator, and when the at least two rotor segments are separated, the stator forms a greatest dimension of the synchronous generator in a first direction that is transverse to the axis of rotation such that the at least two rotor segments are less than an outer diameter of the unitary stator core in the first direction, wherein the rotor is separately excitable.

2. The synchronous generator according to claim 1 wherein the synchronous generator is a ring generator with an open center portion, and includes at least 48 stator poles, wherein the stator has a continuous winding.

3. The synchronous generator according to claim 1 wherein the stator has an outside diameter that is greater than 4.3 m.

4. The synchronous generator according to claim 1 wherein the rotor has an open internal space and at least two rotor segments are ring segments, each with a radial thickness that is less than a diameter of the open internal space.

5. The synchronous generator according to claim 4 wherein each of the rotor segments has a different number of rotor poles.

6. The synchronous generator according to claim 1 wherein the synchronous generator is configured to generate a nominal power of at least 500 kW.

7. The synchronous generator according to claim 6 wherein the synchronous generator is configured to generate a nominal power of at least two MW.

8. A wind power installation comprising:
 a pylon;
 a pod located on the pylon; and
 a synchronous generator located in the pod, the synchronous generator including:
 a stator including a unitary stator core, and
 a rotor located outwardly of the stator, the rotor including at least two detachably attached rotor segments, wherein the at least two detachably attached rotor segments are configured to be arranged in a transit position so that in one direction the at least two detachably attached rotor segments are less than an outer diameter of the unitary stator core, wherein the rotor is separately excitable.

9. A transport arrangement for transporting a partly dismantled synchronous generator having a stator and an external rotor for a gearless wind power installation, the transport arrangement comprising:
 a main transport portion including the stator of the synchronous generator, the stator including a unitary stator core; and
 at least two external rotor segments removed from the synchronous generator, wherein the at least two external rotor segments are arranged relative to each other such that a dimension of the at least two external rotor segments does not exceed an outside diameter of the unitary stator core.

10. The transport arrangement according to claim 9 wherein the at least two removed rotor segments are two rotor halves placed in displaced relationship in a transport position with respect to each other.

11. The transport arrangement according to claim 9 wherein the main transport portion includes at least two external rotor segments mounted to the synchronous generator, wherein the main transport portion in a first direction is of a width corresponding to an outside diameter of the stator, and in a second direction is of a length corresponding to an outside diameter of the rotor.

12. The transport arrangement according to claim 9 wherein the transport arrangement includes a partly dismantled synchronous generator.

13. A method of transporting a synchronous generator of a gearless wind power installation, the method comprises:

providing at least two external rotor segments of the synchronous generator in such a way that in one direction the at least two external rotor segments are reduced to equal to or less than a dimension corresponding to an outside diameter of a stator of the synchronous generator, the stator having a unitary stator core that defines the outside diameter, loading the synchronous generator on to a transport vehicle, transporting the synchronous generator to an erection location of a wind power installation, and fitting the at least two external rotor segments to the synchronous generator at the erection location of the wind power installation.

14. The method according to claim 13 wherein the at least two external rotor segments are two rotor halves placed in displaced relationship with respect to each other such that a dimension of the two rotor halves together does not exceed an outside diameter of the stator.

15. The method according to claim 13 wherein transporting the synchronous generator comprises transporting the at least two external rotor segments on a first vehicle and transporting the stator on a second vehicle.

16. The method according to claim 13 wherein transporting the synchronous generator comprises transporting the at least two external rotor segments and the stator on the same vehicle.

* * * * *